US008156069B2

(12) United States Patent
Allen et al.

(10) Patent No.: US 8,156,069 B2
(45) Date of Patent: Apr. 10, 2012

(54) SYSTEM AND METHOD FOR EXPLAINING A RECOMMENDATION PRODUCED BY A DECISION SUPPORT TOOL

(75) Inventors: David L. Allen, Westlake Village, CA (US); Steven B. Seida, Wylie, TX (US); Krzysztof W. Przytula, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 609 days.

(21) Appl. No.: 12/364,697

(22) Filed: Feb. 3, 2009

(65) Prior Publication Data

US 2009/0222398 A1    Sep. 3, 2009

Related U.S. Application Data

(60) Provisional application No. 61/032,758, filed on Feb. 29, 2008.

(51) Int. Cl.
*G06F 9/44* (2006.01)
*G06N 7/02* (2006.01)
*G06N 7/06* (2006.01)

(52) U.S. Cl. ......................................................... 706/52
(58) Field of Classification Search ..................... 706/52
See application file for complete search history.

(56) References Cited

U.S. PATENT DOCUMENTS 6,460,049 B1   10/2002   Becker et al.
6,601,055 B1    7/2003   Roberts
7,225,174 B2 *  5/2007   Schreckengast et al. ....... 706/45

OTHER PUBLICATIONS

Carmen Lacave and Francisco J Diez; "A review of explanation methods for Bayesian networks". The Knowledge Engineering Review, 17, pp. 107-127, 2002.
D. Madigan, K. Mosurski and R. Almond; "Graphical explanation in Belief Networks," Journal of Computational and Graphical Statistics; pp. 160-181, 1997.
M. Mozina, J. Demsar, M. Kattan and B. Zupan; "Nomograms for Visualization of Naïve Bayesian Classifier"; Proceedings of Principles and Practice of Knowledge Discovery in Databases; pp. 337-348, 2004.
J. Nelson; "Finding Useful Questions: On Bayesian Diagnosticity, Probability, Impact, and Information Gain"; Psychological Review; pp. 979-999, 2005.
B. Poulin, R. Eisner, et al;"Visual Explanation of Evidence in Additive Classifiers, In Proceedings of 18th Conference on Innovative Applications of Artificial Intelligence"; pp. 1822-1829, 2006.

* cited by examiner

*Primary Examiner* — Michael B Holmes
(74) *Attorney, Agent, or Firm* — Schwegman, Lundberg & Woessner, P.A.

(57) ABSTRACT

In accordance with a particular embodiment of the invention, a method for explaining a recommendation produced by a decision support tool is disclosed. The method comprises submitting a list of observation inputs to the decision support tool and producing a recommendation. The list of inputs is then reordered according to an observation metric. The method further comprises quantifying how each input impacts the probability of the recommendation produced. The inputs may then be ranked by comparing the associated changes in probability of the recommendation produced.

18 Claims, 4 Drawing Sheets

SYSTEM AND METHOD FOR EXPLAINING A RECOMMENDATION PRODUCED BY A DECISION SUPPORT TOOL

RELATED APPLICATION

This application claims priority to U.S. Provisional Patent Application Ser. No. 61/032,758, filed Feb. 29, 2008, entitled "DECISION SUPPORT TOOL," which is hereby incorporated by reference in their entirety.

TECHNICAL FIELD

The present disclosure relates generally to decision networks, and more particularly to a system and method for explaining a recommendation produced by a decision support tool.

BACKGROUND

Humans have difficultly making decisions based on multiple pieces of evidence in the presence of uncertainty. This is especially true when the observations contradict each other. Some evidence may support a decision and other evidence may refute it. Also, the amount of available evidence may overwhelm a human decision maker.

SUMMARY OF EXAMPLE EMBODIMENTS

In accordance with a particular embodiment of the invention, a method for explaining a recommendation produced by a decision support tool is disclosed. The method comprises submitting a list of observation inputs to the decision support tool and producing a recommendation. The list of inputs is then reordered according to an observation metric. The method further comprises quantifying how each input impacts the probability of the recommendation produced. The inputs may then be ranked by comparing the associated changes in probability of the recommendation produced.

Certain embodiments of the present invention may provide various technical advantages. For example, a technical advantage of one embodiment may include the capability to provide explanations without focusing on explaining the propagation of evidence through a decision support tool, which requires the decision maker to understand how the decision support tool functions. Other technical advantages of one embodiment may include the capability to aid "human in the loop" decision making by providing fast and reliable explanations. Yet other technical advantages of one embodiment may include the capability to help decision makers determine whether the recommended decision is reliable or whether more observations are necessary. Still yet other technical advantages of one embodiment may include the capability to allow a decision maker to compare multiple explanations and choose an explanation that accurately reflects real-world circumstances.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Decision support tools allows a decision maker, who may not be an expert, to access the expertise programmed into the decision support tool. Decision support tools are also capable of processing a large number of complex operations, whereas excess data may overwhelm a human decision maker. Thus, decision support tools can provide both fast and reliable answers in situations where human experts cannot.

However, humans can be very reluctant to trust the decision support tool's recommendation unless it also provides some justification or explanation as to why that recommendation is better than an alternative decision. For example, a human may not intuitively agree with the recommendation proposed by the decision support tool. Therefore, unless the decision support tool can provide additional information as to why it made its recommendation, the decision maker may simply ignore it.

Figure 1:
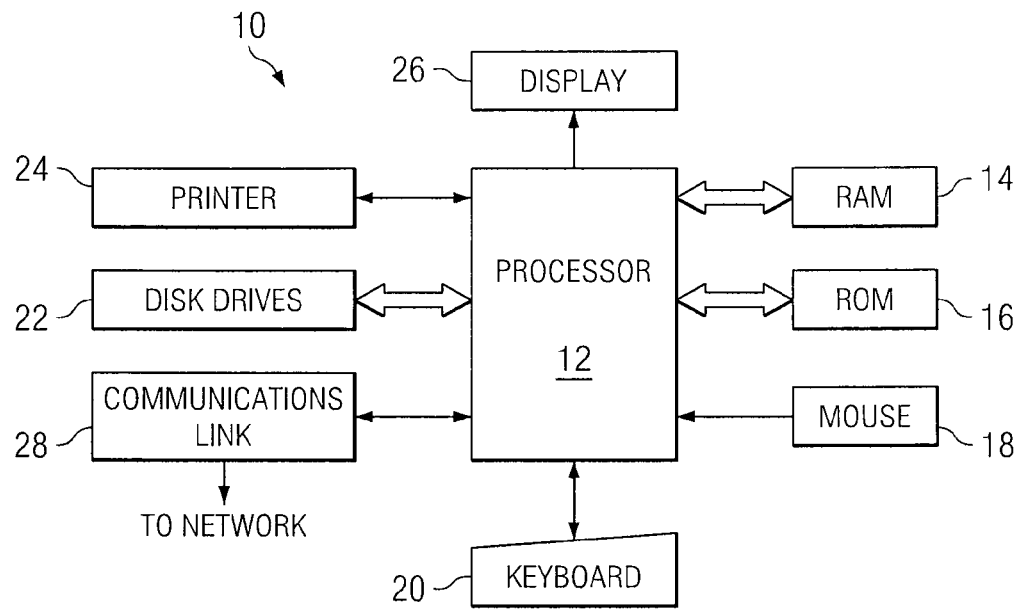
FIG. 1 is an embodiment of a general purpose computer that may be used in connection with one or more pieces of software employed by embodiments of the invention.

Accordingly, teachings of certain embodiments recognize the use of explanations that help decision makers reach a reasoned decision. FIG. 1 presents an embodiment of a general purpose computer 10 that may be used in connection with one or more pieces of software employed by embodiments of the invention. General purpose computer 10 may generally be adapted to execute any of the well-known OS2, UNIX, Mac-OS, Linux, and Windows Operating Systems or other operating systems. The general purpose computer 10 in this embodiment comprises a processor 12, a random access memory (RAM) 14, a read only memory (ROM) 16, a mouse 18, a keyboard 20 and input/output devices such as a printer 24, disk drives 22, a display 26 and a communications link 28. In other embodiments, the general purpose computer 10 may include more, less, or other component parts. Embodiments of the present invention may include programs that may be stored in the RAM 14, the ROM 16 or the disk drives 22 and may be executed by the processor 12. The communications link 28 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 22 may include a variety of types of storage media such as, for example, floppy disk drives, hard disk drives, CD ROM drives, DVD ROM drives, magnetic tape drives or other suitable storage media. Although this embodiment employs a plurality of disk drives 22, a single disk drive 22 may be used without departing from the scope of the invention.

Although FIG. 1 provides one embodiment of a computer that may be used with other embodiments of the invention, such other embodiments may additionally utilize computers other than general purpose computers as well as general purpose computers without conventional operating systems. Additionally, embodiments of the invention may also employ multiple general purpose computers 10 or other computers networked together in a computer network. Most commonly, multiple general purpose computers 10 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 1, the logic comprises computer software executable on the general purpose computer 10. The medium may include the RAM 14, the ROM 16 or the disk drives 22. In other embodiments, the logic may be contained within hardware configuration or a combination of software and hardware configurations. The logic may also be embedded within any other suitable medium without departing from the scope of the invention.

Figure 2:
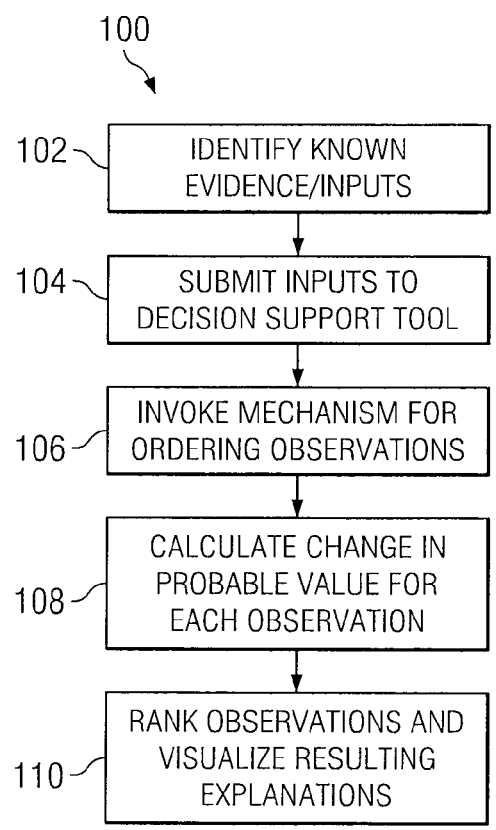
FIG. 2 is a flow diagram illustrating a method for explaining a recommendation produced by a decision support tool according to several embodiments of the invention.

FIG. 2 is a flow diagram illustrating a method for explaining a recommendation produced by a decision support tool, generally designated by reference numeral 100, according to several embodiments of the invention.

The method begins at step 102 and 104, where a list of observations, or inputs, is identified and submitted to a decision support tool and one or more recommendations are produced. Embodiments of the decision support tool may include any tool operable to receive a question, weigh available evidence, and suggest an answer. Embodiments of the decision support tool may comprise software to be executed on a computer system, such as the computer system illustrated in FIG. 1.

For example, one embodiment of the current invention might include a medical-diagnoses decision support tool operable to request as input the patient's symptoms, test results, and other relevant facts; using these inputs, the tool would recommend diagnosis of one or more potential illnesses. Other examples of decision support tools might include industries such as business, manufacturing, engineering, applied sciences, immigration, military, space, traffic, transportation, education, etc. Embodiments of the decision support tool are not limited to any particular industry or subject area, and the examples listed above are intended for illustration purposes only.

Embodiments of the decision support tool may be in the form of a probabilistic network model. Probabilistic network models are based on a graphical representation of the relationships among variables. Examples of probabilistic network models include the Markov and Bayesian networks, which may use a simplified structure of a naive or layered Bayesian network. Probabilistic network models are operable to account for uncertainty and report answers in the form of probabilities. For example, the medical-diagnoses decision support tool example referenced above might identify a 75% probability of illness A, a 20% probability of illness B, and a 5% probability of illnesses C. In other examples, when more than one illness may occur at the same time, the probabilities of illnesses A, B, and C might add up to a total greater than or lesser than 100%.

The decision support tool may produce one or multiple recommendations according to different embodiments of the invention. In some embodiments, the decision support tool may rank competing recommendations according to probability or some other metric. For example, the medical-diagnosis decision support tool example embodiment referenced above might rank the available recommendations as (1) A, (2) B, and (3) C according to the probability that the patient has the target illness.

Once the decision support tool returns a recommendation, steps 106 through 110 provide an explanation supporting the recommendation. At step 106, embodiments of the invention automatically reorder the list of inputs from step 102 according to one of several metrics. As the discussion accompanying step 108 explains, a change in the order of inputs from step 106 may change the quantified explanations resulting from step 108. Thus, although embodiments of the invention may use any mechanism for reordering the list of inputs some reordering mechanisms may result in more useful explanations than others. The usefulness of a reordering mechanism may depend on the decision support tool, the subject matter, the question being answered, or other factors.

Embodiments of the invention may choose not to reorder the list of inputs, allowing the list of inputs to represent the order in which observations were submitted to the decision support tool. However, other embodiments will reorder the inputs to quantify how much each input impacted the final recommendation. In some embodiments, orderings different from the actual order in which they were acquired in may be more useful for providing an explanation.

In embodiments where the decision support tool is based on a proper Bayesian network model of the decision domain, multiple existing metrics are available for automatically ordering observations to better support explanation of a recommended decision by taking into account the set of observations and also the specific decision being reasoned about. Three such metrics are the Log Diagnosticity, the Kullback-Leibler (KL) Distance, and the Impact metric:

$$\log \text{Diagnosticity} = \log \max\left(\frac{Pr(e|T)}{Pr(e|T')}, \frac{Pr(e|T')}{Pr(e|T)}\right), \quad (1)$$

$$\frac{Pr(e|T)}{Pr(e|T')} = \frac{\frac{Pr(T|e)}{Pr(T'|e)}}{\frac{Pr(T)}{Pr(T')}}, \quad (2)$$

$$KL(e) = \sum_T \left[Pr(T|e) * \log_2 \frac{Pr(T|e)}{Pr(T)}\right], \text{ and} \quad (3)$$

$$I(e) = \frac{1}{\text{size}(T)}\left(\sum_T |Pr(T|e) - Pr(T)|\right), \quad (4)$$

where Pr(T|e) is the posterior probability of the recommended decision or, using nomenclature from Bayesian networks, target variable T being in the target state given observation input e, Pr(T) is the prior probability that variable T is in the target state, and Pr(T') is the prior probability that T is not in the target state.

Next, step 108 attempts to quantify an explanation for the recommendation based on the reordered list of observation input variables provided by step 106. Embodiments of the invention quantify the explanation by computing the change in probability of the recommendation variable given availability of each observation input.

One mechanism available in some embodiments is to compute the change in probability of a recommendation for each input by treating each input as a new observation. This mechanism operates by applying inputs sequentially to a recommendation and monitoring the changes in the posterior probability of the recommendation.

For example, a decision support tool determines the probability of a recommendation chosen from available recommendations X, Y, and Z, with X, Y, and Z having a priori probabilities of 10%, 5%, and 2%. If the list of inputs from step 106 provides five observations ordered from 1 to 5, then one can quantify how each observation contributes to an explanation by computing how each new observation changes the probability of the recommendation. For example, if input 1 changes the probability of recommendation X from 10% (the a priori probability) to 80%, then input 1 contributed 70%. Likewise, input 2 may then change the probability of decision X from 80% (the a priori and input 1 probability) to 75%, contributing −5%. Input 3 may change the probability to 85%, input 4 to 95%, and input 5 to 98%. Thus, inputs 1 through 5 would have contributed 70%, −5%, 10%, 10%, and 3% respectively.

However, in some embodiments, these calculations may change depending on which metric of explanation quantification is used. For example, two of the metrics available in embodiments of the invention are the Posterior Delta and Weight of Evidence (WOE) metrics. The Posterior Delta metric is defined as:

$$\text{Posterior\_Delta}(T:e|\mathbf{g}) = |Pr(T|e,\mathbf{g}) - Pr(T|\mathbf{g})|, \quad (5)$$

where $Pr(T|e,\mathbf{g})$ is the posterior probability of recommendation or target variable T being in the target state given observations e and $\mathbf{g}$, and $Pr(T|\mathbf{g})$ is the probability that T is in the target state given only observations $\mathbf{g}$. Note that bold variables, such as $\mathbf{g}$, represent sets of one or more observations, while non-bold variables, such as e, represent single observations. The Weight of Evidence metric is defined as:

$$WOE_{Ordered}(T:e|\mathbf{g}) = \log\left(\frac{\frac{Pr(T|e,\mathbf{g})}{Pr(T'|e,\mathbf{g})}}{\frac{Pr(T|\mathbf{g})}{Pr(T'|\mathbf{g})}}\right), \quad (6)$$

where $Pr(T|e,\mathbf{g})$ and $Pr(T|\mathbf{g})$ are defined as above, and $Pr(T'|e,\mathbf{g})$ and $Pr(T'|\mathbf{g})$ are the posterior probabilities of T not being in the target state given the listed observations.

The Posterior Delta and Weight of Evidence metrics quantify the change in probability differently. The Posterior Delta metric uses the absolute value of the change in posterior probability value, in which case a change from 93% to 98% (a change of 5%) is equal to a change from 50% to 55% (also a change of 5%). Using the Weight of Evidence metric, however, the change from 93% to 98% would have more of an impact than that from 50% to 55%.

Both the Posterior Delta and the Weight of Evidence metrics also rely on an ordering of the observations—in other words, the impact of each observation changes depending on when it was obtained in a sequence of all known observations. Thus, if the order of observations is changed, then the contributions of each observation may change as well. Thus, in embodiments of the invention, which is using metrics such as the Posterior Delta and Weight of Evidence, the sequencing process in step 106 may change the results of step 108.

Thus, a user may repeat the steps outlined in FIG. 2 using different observation sequencing techniques in step 106 and different explanation quantification metrics in step 108. Each iteration of this process may result in a different explanation for the recommendation found in step 104. The user may then compare these explanations to the real world and choose the most sensible explanation.

Finally, at step 110, the method reports the explanation produced by steps 102 through 108. Embodiments of the invention include numerous means for visualizing the resulting explanations. Some embodiments will incorporate the visualization into a graphical user interface, allowing the user to change the metrics used in steps 106 and 108 and then visualize the change in explanations.

It should be understood that some of the steps illustrated in FIG. 2 may be combined, modified, or deleted where appropriate, and additional steps may also be added to the flow diagram.

Figure 3:
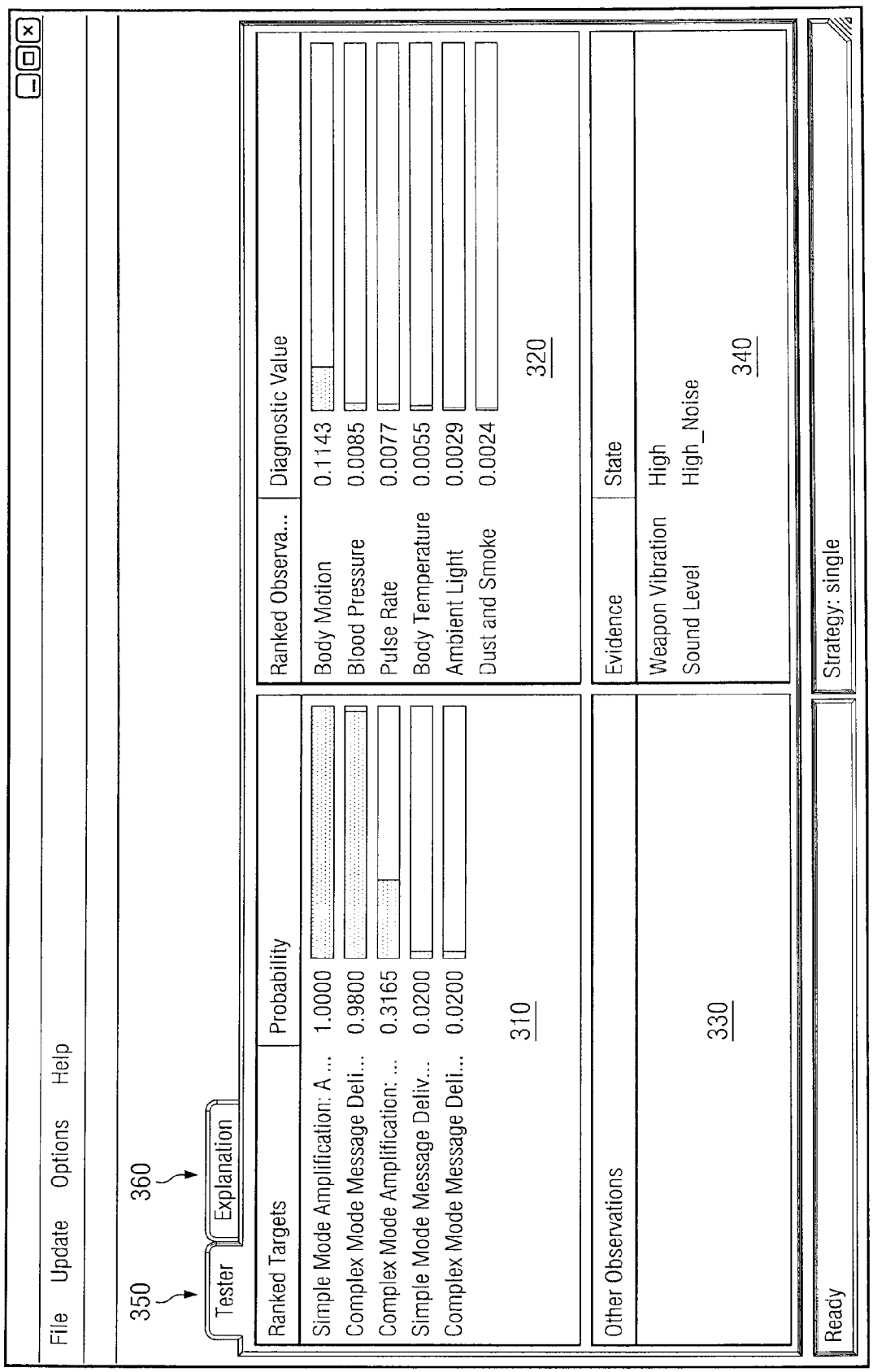
FIG. 3 illustrates a example user interface for the example decision support tool.
Figure 4:
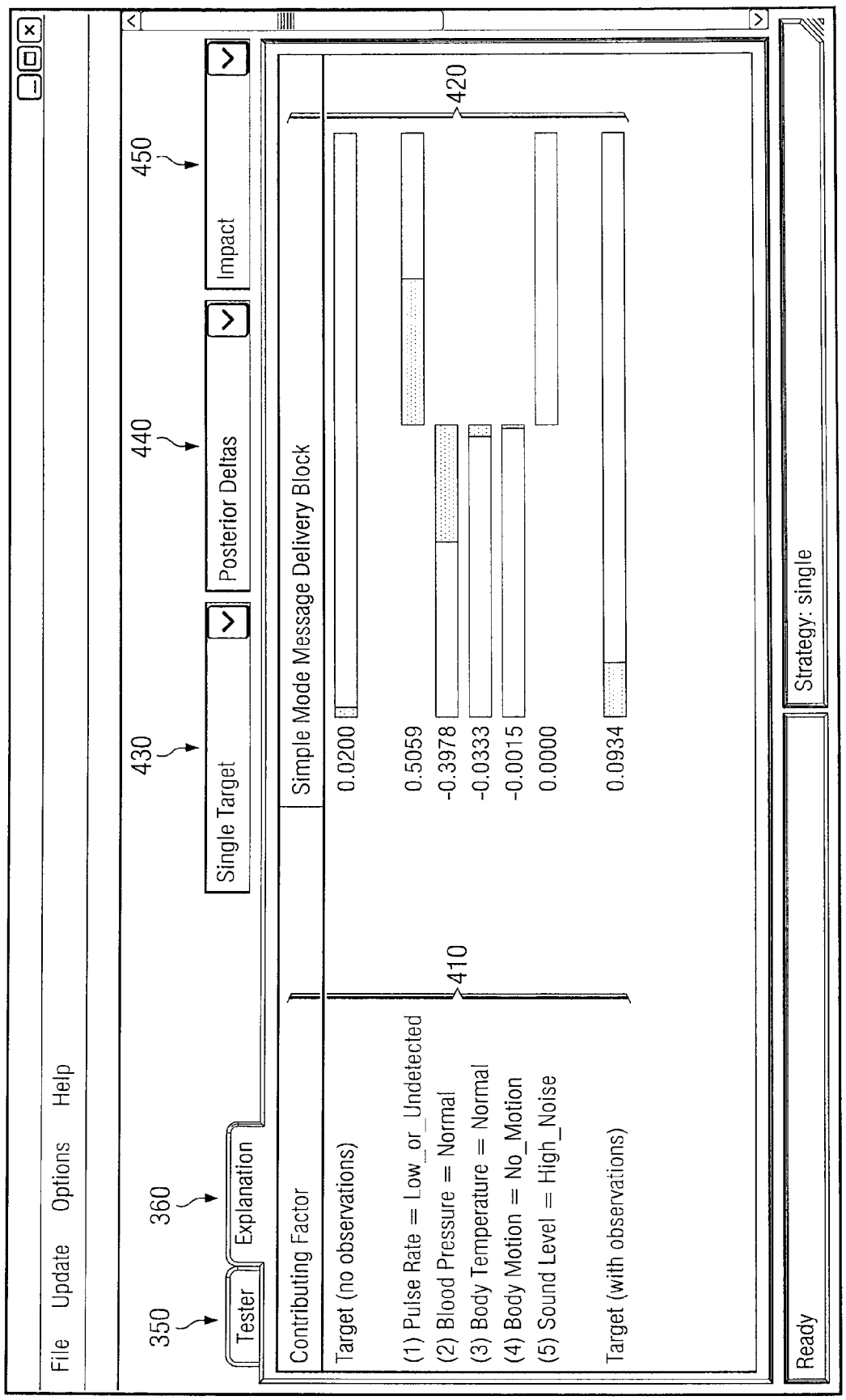
FIGS. 4 and 5 illustrate example user interfaces for an example explanation tool according to multiple embodiments of the invention.
Figure 5:
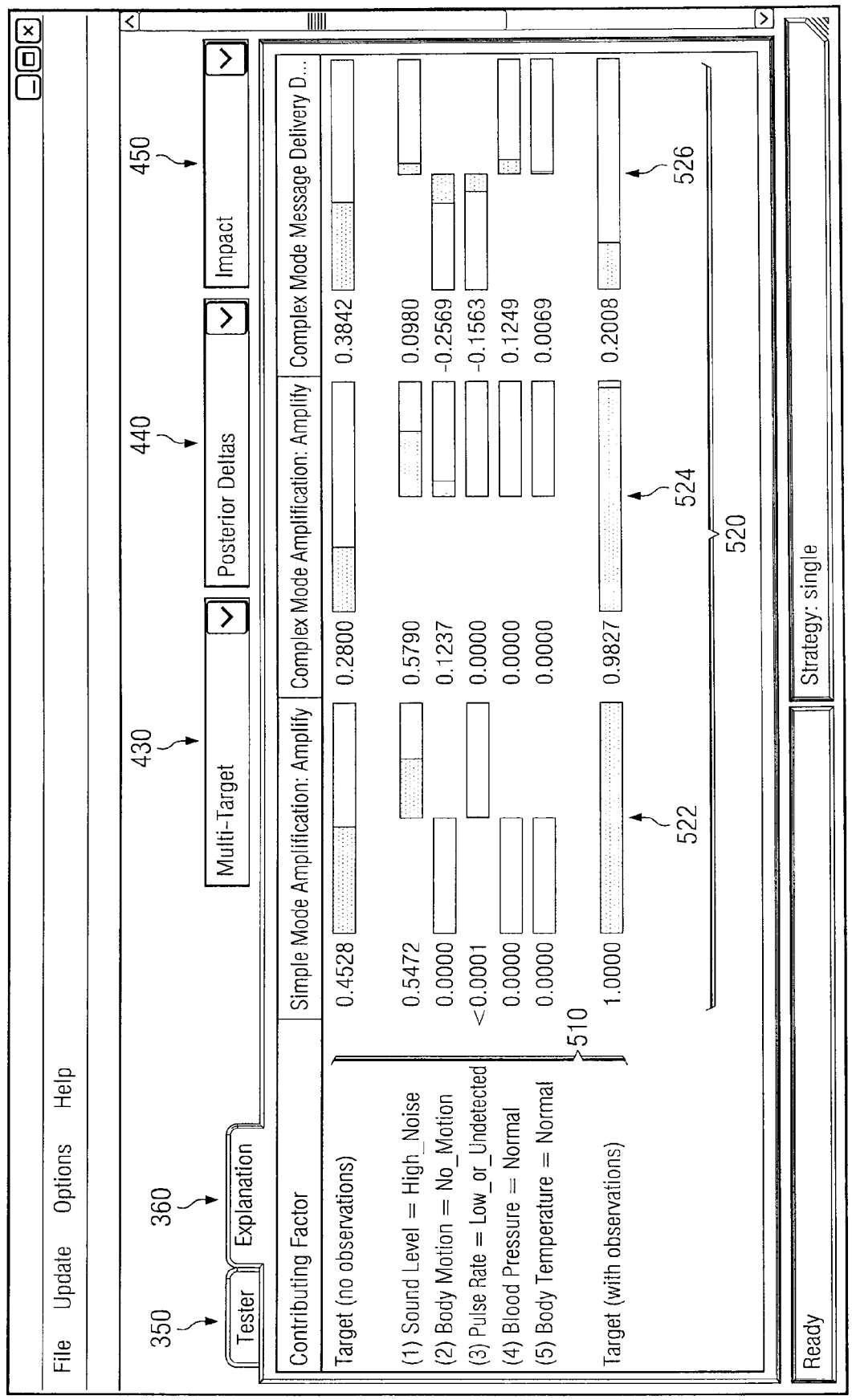

FIGS. 3, 4, and 5 illustrate example user interfaces operating with an example decision support tool according to multiple embodiments of the invention. The example decision support tool visualized in FIGS. 3, 4, and 5 is configured to assist in determining the method for transmitting communications to a solider in a tactical military environment. This example decision support tool is intended for illustration purposes only and does not limit the scope of the invention.

FIGS. 3, 4, and 5 feature Tester tab 350 and Explanation tab 360. Tester tab 350 enables a user to access a user interface for the decision support tool. Explanation tab 360 enables a user to access a user interface for an explanation tool.

FIG. 3 illustrates an example user interface for the example decision support tool. An evidence box 340 lists all known observations or inputs. In this example, the observations represent evidence of the soldier's current status in the field, such as whether the soldier is engaged in combat or is at rest. Evidence box 340 illustrates two known observations for this example: high weapon vibration and high sound level. The example decision support tool can recognize these inputs and recommend a communication method. For example, high weapon vibration and high sound level may suggest the soldier is in a combat situation and thus can only respond to high-priority messages. The example decision support tool is operable to adjust the recommended decision to account for these observations.

A ranked targets box 310 lists potential recommendations or decisions from the decision support tool. In this example, ranked targets box 310 lists five of the potential methods of communicating with a solider in a tactical military environment. The embodiment illustrated in FIG. 2 determines probability for each potential method of communication. However, other embodiments may display the probabilities in a different manner, such as calculating the probabilities in relation to each other such that the total of all probabilities equals 100%. The example communication methods listed in ranked target box 310 vary according to characteristics such as mode type (simple or complex), message type (message delivery or amplification), and priority type (amplified, delayed, or blocked). According to this example, the highest probability communication means available are "Simple Mode Amplification: Amplify" and "Complex Mode Message Delivery: Delayed."

A ranked observations box 320 list unknown observations. Embodiments of the invention using a Bayesian decision support tool can determine probabilities by accounting for unknown data. In this example, ranked observations box 320 lists unknown observations and measures how each unknown observation might impact or change the recommendations or decisions listed in box 310. According to ranked observations box 320, "Body Motion" has an 11.43% diagnostic value, but "Blood Pressure," "Pulse Rate," "Body Temperature,"

"Ambient Light," and "Dust and Smoke" have little diagnostic value. A user can use this information to determine whether more observation data is necessary.

An other observations box 330 is operable to establish other inputs such as total precondition observations. The embodiment illustrated in FIG. 3 lists no other inputs in other observations box 330. Example total preconditions might include time and date data or climate information. For example, if "winter conditions" is a total precondition, then it may be less likely that the soldier is engaged in combat, even if weapon vibration and sound levels are both high. Thus, like the inputs listed in evidence box 340, other observations box 330 illustrates inputs into the decision support tool. Other embodiments of the invention may contain variations of boxes 330 and 340.

FIGS. 4 and 5 illustrate example user interfaces for an example explanation tool according to multiple embodiments of the invention. A user invokes the example explanation tool by selecting Explanation tab 360, as illustrated in FIGS. 3, 4, and 5.

FIG. 4 illustrates an explanation for a single recommendation (whether "Simple Mode Message Delivery: Blocked" should be invoked). FIG. 4 features a list of input observations 410 and an associated list of explanations 420. The list of explanations 420 measures the impact each input or observation has on the decision (here, "Simple Mode Message Delivery: Blocked"). In some embodiments, the decision (here, "Simple Mode Message Delivery: Blocked") may be selected from the recommendations or decisions listed in box 310 in FIG. 3.

According to this example explanation tool, the probability of the recommendation "Simple Mode Message Delivery: Blocked" is only 2% without any observations. According to the decision support tool, the overall recommendation probability increases from 2% to 9.34% when considering all five inputs. The explanation tool then presents the following explanations for how each input impacted the probability of the decision. Observation 1 (Pulse Rate=Low or Undetected) increases the probability by 50.59%. Observation 2 (Blood Pressure=Normal) then decreases the probability by 39.78%. Observations 3, 4, and 5 (Body Temperature=Normal, Body Motion=No Motion, Sound Level=High Noise) have little affect on the probability.

This example explanation tool explains the probability of the recommendation "Simple Mode Message Delivery: Blocked" by quantifying how observations 1-5 affect the decision support tool. In this example, the overall probability is relatively low, only 9.34%, but this might be explained by the conflict between pulse rate and blood pressure. For example, a low or undetected pulse rate might suggest fatigue or another medical condition, but normal blood pressure might suggest that the soldier is actually healthy. Thus, the explanation tool is operable to inform the user as to the significance and weight of the target recommendation (here, "Simple Mode Message Delivery: Blocked").

FIG. 4 illustrates several features contained in some embodiments of the invention. For example, some embodiments may reorder the displayed observations. In some embodiments, the explanation interface is operable to reorder the displayed observations from greatest impact to least impact. In other embodiments, the explanation interface may present the observations in the order of measurement, such as the order of inputs calculated by the Posterior Delta, Weight of Evidence, or another metric. These methods of visualizing the explanations are for illustrative purposes only and are not intended to limit the scope of the invention.

The example explanation interface illustrated in FIG. 4 also features drop down menus allowing a user to specify a metric for reordering observations and a metric for computing the change in probability based on each observation. In the example embodiment illustrated in FIG. 4, drop-down menu 440 enables a user to choose between observation metrics such as Posterior Deltas and Weight of Observation. Drop-down menu 450 enables a user to choose between observation metrics such as Log Diagnosticity, the Kullback-Leibler (KL) Distance, and the Impact metric. Other embodiments of the invention might retain, omit, or include variations of drop-down menus 440 and 450 without departing from the scope of the invention.

The embodiment illustrated in FIG. 4 also enables a user to choose between the "Single Target" and "Multi-Target" visualization options listed in drop-down menu 430. "Single Target" mode provides explanations for one target recommendation, and "Multi-Target" mode provides explanations for multiple target recommendation. Other embodiments of the invention might retain, omit, or include variations of drop-down menu 430.

An example embodiment of a user interface in "Multi-Target" mode is illustrated in FIG. 5. As in FIG. 4, FIG. 5 features drop-down menus 430, 440, and 450.

FIG. 5 features a list of input observations 510 and explanations 520. Explanations 520 is comprised of a series of explanation lists (522, 524, and 526), each explanation list measuring impact each input or observation has on a specified recommendation.

According to example explanation list 522, the probability of the recommendation "Simple Mode Amplification: Amplify" is 45.28% without any observations. According to the decision support tool, the overall decision probability increases from 45.28% to 100% when considering all five inputs. The explanation tool then presents the following explanations for how each input impacted the probability of the recommendation. Observation 1 (Sound Level=High Noise) increases the probability by 54.72%. Observations 2, 3, 4, and 5 (Body Motion=No Motion, Pulse Rate=Low or Undetected, Blood Pressure=Normal, Body Temperature=Normal) have little affect on the probability.

According to example explanation list 524, the probability of the recommendation "Complex Mode Amplification: Amplify" is 28% without any observations. According to the decision support tool, the overall decision probability increases from 28% to 99.27% when considering all five inputs. The explanation tool then presents the following explanations for how each input impacted the probability of the recommendation, Observation 1 (Sound Level=High Noise) increases the probability by 57.90%. Observation 2 (Body Motion=No Motion) increases the probability by 12.37%. Observations 3, 4, and 5 (Pulse Rate=Low or Undetected, Blood Pressure=Normal, Body Temperature=Normal) have little affect on the probability.

According to example explanation list 526, the probability of the recommendation "Complex Mode Message Delivery: Delay" is 38.42% without any observations. According to the decision support tool, the overall decision probability decreases from 38.42% to 20.08% when considering all five inputs. The explanation tool then presents the following explanations for how each input impacted the probability of the recommendation. Observation 1 (Sound Level=High Noise) increases the probability by 9.8%. Observation 2 (Body Motion=No Motion) decreases the probability by 25.69%. Observations 3 (Pulse Rate=Low or Undetected) decreases the probability by 15.63%. Observation 4 (Blood Pressure=Normal) increases the probability by 12.49%. Observation 5 (Temperature=Normal) increases the probability by 0.69%.

In the embodiment illustrated in FIG. 5, the order of observations displayed in the list of input observations 510 may not necessarily match the order created by reordering metrics such as Posterior Deltas or Weight of Evidence.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke 6 of 35 U.S.C. §112 as it exists on the date of filing hereof unless the words "means for" or "step for" are explicitly used in the particular claim.

What is claimed is:

1. A computer-implemented method for explaining a recommendation produced by a decision support tool comprising:
   using a computer system, submitting a list of observation inputs to a decision support tool to produce a recommendation;
   using a computer system, reordering the list of observation inputs according to an observation metric; and
   using a computer system, quantifying how each observation input impacts the probability of the recommendation produced by:
      sequentially applying inputs from the reordered list of inputs to the decision support tool; and
      measuring the change in probability of the recommendation for each input with an explanation metric.

2. The method of claim 1, wherein the decision support tool is based on a Bayesian network.

3. The method of claim 1, wherein the observation metric is a Log Diagnosticity calculation, a Kullback-Leibler distance calculation, or an Impact calculation.

4. The method of claim 1, wherein the explanation metric is a Weight of Evidence calculation or a Posterior Delta calculation.

5. The method of claim 1, further comprising providing a user of a computer system with a display of how each input impacts the probability of the recommendation produced.

6. A system for explaining a recommendation produced by a decision support tool, the system comprising software encoded in a computer readable medium and when executed by one or more processors operable to:
   submit a list of observation inputs to a decision support tool to produce a recommendation;
   reorder the list of inputs according to an observation metric; and
   quantify how each input impacts the probability of the recommendation produced by:
      sequentially applying inputs from the reordered list of inputs to the decision support tool; and
      measuring the change in probability of the recommendation for each input with an explanation metric.

7. The system of claim 6, wherein the decision support tool is based on a Bayesian network.

8. The system of claim 6, wherein the observation metric is a Log Diagnosticity calculation, a Kullback-Leibler distance calculation, or an Impact calculation.

9. The system of claim 6, wherein the explanation metric is a Weight of Evidence calculation or a Posterior Delta calculation.

10. The system of claim 6, further comprising displaying how each input impacts the probability of the recommendation produced.

11. A computer-implemented method for explaining a recommendation produced by a decision support tool comprising:
   using a computer system, submitting a list of observation inputs to a decision support tool to produce a recommendation;
   using a computer system, reordering the list of observation inputs according to an observation metric;
   using a computer system, quantifying how each observation input impacts the probability of the recommendation produced; and
   providing a user of a computer system with a display of how each input impacts the probability of the recommendation produced.

12. The method of claim 11, wherein the decision support tool is based on a Bayesian network.

13. The method of claim 11, wherein the observation metric is a Log Diagnosticity calculation, a Kullback-Leibler distance calculation, or an Impact calculation.

14. The method of claim 11, wherein quantifying how each input impacts the probability of the recommendation produced comprises:
   sequentially applying inputs from the reordered list of inputs to the decision support tool; and
   measuring the change in probability of the recommendation for each input with a Weight of Evidence calculation or a Posterior Delta calculation.

15. A system for explaining a recommendation produced by a decision support tool, the system comprising software encoded in a computer readable medium and when executed by one or more processors operable to:
   submit a list of observation inputs to a decision support tool to produce a recommendation;
   reorder the list of inputs according to an observation metric;
   quantify how each input impacts the probability of the recommendation produced; and
   displaying how each input impacts the probability of the recommendation produced.

16. The system of claim 6, wherein the decision support tool is based on a Bayesian network.

17. The system of claim 6, wherein the observation metric is a Log Diagnosticity calculation, a Kullback-Leibler distance calculation, or an Impact calculation.

18. The system of claim 6, wherein quantifying how each input impacts the probability of the recommendation produced comprises:
   sequentially applying inputs from the reordered list of inputs to the decision support tool; and
   measuring the change in probability of the recommendation for each input with a Weight of Evidence calculation or a Posterior Delta calculation.

* * * * *